United States Patent
Wartmann

(10) Patent No.: US 9,279,668 B2
(45) Date of Patent: Mar. 8, 2016

(54) DEVICE AND METHOD FOR THE THREE-DIMENSIONAL MEASUREMENT OF AN OBJECT

(75) Inventor: Rolf Wartmann, Waake (DE)

(73) Assignee: Carl Zeiss Microscopy GmbH, Jena (DE)

(*) Notice: Subject to any disclaimer, the term of this patent is extended or adjusted under 35 U.S.C. 154(b) by 424 days.

(21) Appl. No.: 13/825,790

(22) PCT Filed: Sep. 16, 2011

(86) PCT No.: PCT/EP2011/066083
§ 371 (c)(1),
(2), (4) Date: Jun. 10, 2013

(87) PCT Pub. No.: WO2012/038335
PCT Pub. Date: Mar. 29, 2012

(65) Prior Publication Data
US 2013/0250069 A1    Sep. 26, 2013

(30) Foreign Application Priority Data

Sep. 24, 2010 (DE) .......................... 10 2010 041 382

(51) Int. Cl.
*G01B 11/24* (2006.01)
*G01C 11/02* (2006.01)
(Continued)

(52) U.S. Cl.
CPC ............... *G01B 11/24* (2013.01); *G01C 11/02* (2013.01); *G02B 13/22* (2013.01); *G02B 21/22* (2013.01)

(58) Field of Classification Search
CPC .. G01B 11/24; G01B 11/245; A61B 1/00193; H04N 13/0239; G01C 11/02; G02B 13/22; G02B 21/22; G02B 21/025
USPC ...................... 359/374–376; 348/45; 356/611
See application file for complete search history.

(56) References Cited

U.S. PATENT DOCUMENTS 6,229,913 B1 * 5/2001 Nayar ................ G02B 27/2278
250/201.4
6,252,717 B1    6/2001 Grosskopf
(Continued)

FOREIGN PATENT DOCUMENTS

DE    196 51 667 C2    9/1997
DE    196 47 510 A1    5/1998
(Continued)

OTHER PUBLICATIONS

Gottfried Schröder: "Technische Optik", Jan. 1, 1998, Vogel Fachbuch, XP002663140, ISBN: 3-8023-1734-3 p. 65, p. 65 (Partial translation).
(Continued)

*Primary Examiner* — Frank Font
(74) *Attorney, Agent, or Firm* — Patterson Thuente Pedersen, P.A.

(57) ABSTRACT

A device for three-dimensional measurement of an object, with a stereomicroscope of the telescope type, which has a common objective and a first and a second tube lens, a first image sensor, which is assigned to the first tube lens, a second image sensor (8), which is assigned to the second tube lens, and a control unit, which determines the three-dimensional shape of the object from the images obtained with the two image sensors and carries out a predetermined three-dimensional measurement, wherein the stereomicroscope is designed such that the images are obtained with object-side telecentric conditions of the stereomicroscope.

8 Claims, 2 Drawing Sheets

(51) Int. Cl.
*G02B 13/22* (2006.01)
*G02B 21/22* (2006.01)

(56) References Cited

U.S. PATENT DOCUMENTS

| | | | |
|---|---|---|---|
| 7,075,662 B2* | 7/2006 | Hallerman | G01N 21/8806 356/604 |
| 7,180,660 B2 | 2/2007 | Hauger et al. | |
| 7,193,773 B2 | 3/2007 | Haisch et al. | |
| 7,453,631 B2 | 11/2008 | Namii et al. | |
| 7,496,241 B1* | 2/2009 | Reneker | G01C 11/02 382/260 |
| 7,564,620 B2 | 7/2009 | Winterot et al. | |
| 7,704,402 B2 | 4/2010 | Hamamura et al. | |
| 2004/0264764 A1* | 12/2004 | Kochi | G01B 15/04 382/154 |
| 2007/0023716 A1* | 2/2007 | van der Burgt | G01B 11/2545 250/559.29 |
| 2009/0153881 A1* | 6/2009 | Cho | G01B 11/272 356/614 |

FOREIGN PATENT DOCUMENTS

| | | |
|---|---|---|
| DE | 10 2005 040 830 A1 | 3/2007 |
| EP | 0 867 689 A2 | 9/1998 |
| EP | 1 333 305 A2 | 8/2003 |
| EP | 1 333 306 A2 | 8/2003 |
| EP | 1 806 601 A1 | 7/2007 |
| JP | 2003-329927 | 11/2003 |

OTHER PUBLICATIONS

Konrad Hentschel, Michael Müller: "Telezentrische Objektive für die industrielle Bildverarbeitung", Apr. 23, 1999, pp. 1-4, XP002663141, Retrieved from the Internet: URL:http://www.sil-loptics.de/downloads/telez.objektive.pdf [retrieved on Nov. 9, 2011] the whole document (Partial translation).

* cited by examiner

DEVICE AND METHOD FOR THE THREE-DIMENSIONAL MEASUREMENT OF AN OBJECT

PRIORITY CLAIM

The present application is a National Phase entry of PCT Application No. PCT/EP2011/066083, filed Sep. 16, 2011, which claims priority from DE Application No. 102010041382.8, filed Sep. 24, 2010, both which are hereby incorporated by reference herein in their entirety.

FIELD OF THE INVENTION

The present invention relates to a device and a method for three-dimensional measurement of an object.

BACKGROUND OF THE INVENTION

In the area of quality assurance, three-dimensional measurement of objects or workpieces is an everyday task. Contactless methods are of particular interest, because these practically rule out any damage to the workpiece and permit a fast cycle time. Optical methods of triangulation may be mentioned in particular. These use two optical images of the object to be measured, which were taken from different positions. The three-dimensional shape of the object to be measured can be obtained by comparing the two images.

However, these methods require precise knowledge of the imaging positions and of the optical channels with which the images were obtained. An arrangement with two identical objectives, aligned parallel to one another, would be particularly advantageous. In practice, however, this is very expensive, because owing to manufacturing tolerances no identical objectives are available.

On this basis, the problem to be solved by the invention is to provide a device for three-dimensional measurement of an object, with which three-dimensional measurement can be carried out with the desired accuracy at the lowest possible cost. Moreover, a corresponding method for three-dimensional measurement of an object is to be provided.

SUMMARY OF THE INVENTION

The object is achieved in embodiments of the invention by a device for three-dimensional measurement of an object, with a stereomicroscope of the telescope type, which has a common objective and a first and a second tube lens, a first image sensor, which is assigned to the first tube lens, a second image sensor, which is assigned to the second tube lens, and a control unit, which determines the three-dimensional shape of the object from the images recorded with the two image sensors and carries out a predetermined three-dimensional measurement, wherein the stereomicroscope is designed such that the images are obtained with object-side telecentric conditions of the stereomicroscope.

As a stereomicroscope of the telescope type is used, in which a common objective is provided for both tube lenses, the problems of identical objectives are substantially eliminated compared with an arrangement with two identical objectives. The same objective is used on both channels. Moreover, with stereomicroscopes of the telescope type, the two tube lenses as a rule fulfil extreme requirements with respect to orientation and equality of magnification, with the result that the prerequisites for three-dimensional measurement are also ideal from this aspect. Finally the stereomicroscope is used such that the images are recorded with the stereomicroscope object-side telecentric. This means that per channel, for all object points, there is a common projection centre (which in this case is located at infinity), with the result that despite the Abbe sine condition that must necessarily be fulfilled, a successful three-dimensional reconstruction can be carried out with the desired accuracy of the imaged object.

In particular, for establishing object-side telecentric conditions with the device according to the invention, the tube lenses and the objective can be adjusted such that the entrance pupils of the two tube lenses, relative to the optical axis of the objective, coincide with the rear focus of the objective. This ensures that the desired and necessary object-side telecentric conditions are obtained during recording of the image.

Moreover, in the device according to embodiments of the invention, for establishing object-side telecentric conditions, the tube lenses and the objective can be adjusted such that the following inequality $$|s_p| > \left| f' + \frac{10 y \cdot \beta'_{max}}{\beta' \cdot NA_{max}^2 \sqrt{1 - NA_{max}^2}} \right|$$

is fulfilled, wherein $s_p$ denotes the distance from the entrance pupil of the objective along the optical axis of the objective to the front principal plane of the objective, y denotes the height of the imaged object, $\beta'$ denotes the imaging scale of the stereomicroscope relative to the intermediate image plane, $\beta'_{max}$ denotes the maximum imaging scale of the stereomicroscope relative to the intermediate image plane and $NA^2_{max}$ denotes the numerical aperture of the highest magnification of the respective channel. The entrance pupil of the objective results from the image of the pupil of the tube lens in the object space of the objective.

The respective tube lens can contain one lens or consist of exactly one lens.

The object is further achieved by a method with the features of claim 4. Developments of the method according to the invention are presented in the dependent method claims.

It goes without saying that the aforementioned features and those yet to be explained below can be used not only in the stated combinations, but also in other combinations or on their own, while remaining within the framework of the present invention. In particular, a device according to embodiments of the invention can be developed such that steps of a method according to embodiments of the invention can be implemented therewith. A method according to embodiments of the invention can also be developed such that it has steps that can have been carried out or can be carried out by the device according to the invention.

BRIEF DESCRIPTION OF THE DRAWINGS

The invention is explained in further detail below by way of example using the attached drawings. There are shown in.

DETAILED DESCRIPTION

Figure 1:
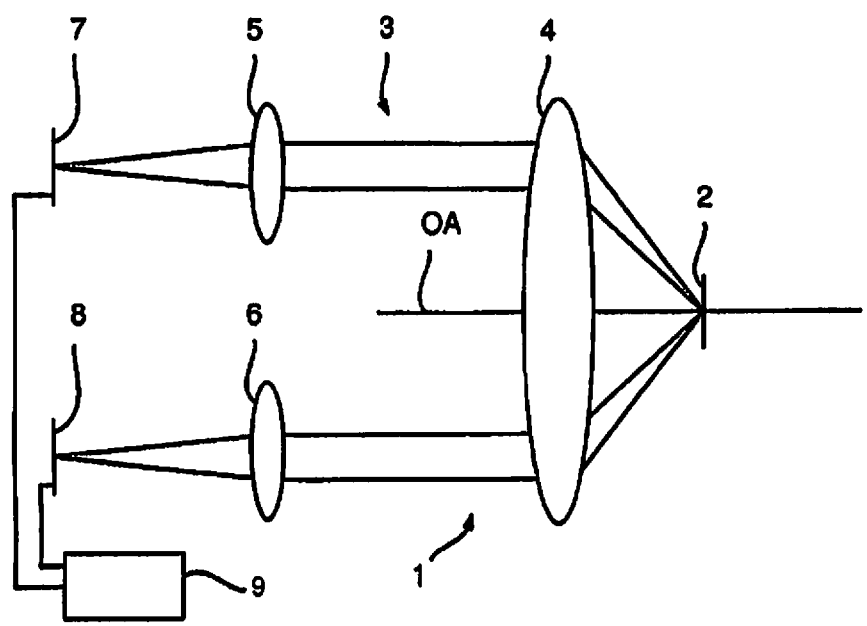
FIG. 1 is a schematic view of one embodiment of the device according to the invention for three-dimensional measurement of an object.

In the embodiment shown in FIG. 1, the device according to the invention 1 for three-dimensional measurement of an object 2 comprises a stereomicroscope 3 of the telescope type, which comprises a common objective 4, a first tube lens 5 and a second tube lens 6. The tube lenses 5, 6 can in each case also be designated as pancrat (zoom lens) or as pancratic post-magnification channel. Moreover, the stereomicroscope 3 contains a first and second image sensor 7, 8, wherein the first image sensor 7 is assigned to the first tube lens 5 and the second image sensor 8 is assigned to the second tube lens 6.

As can be seen from the schematic representation in FIG. 1, by means of the objective 4, the first tube lens 5 and the first image sensor 7, the object 2 can be recorded from a first direction of view, with the result that there is an image of a first recording channel. By means of the objective 4, the second tube lens 6 and the second image sensor 8, the object 2 can be recorded from a second direction of view, with the result that there is an image of a second recording channel. The three-dimensional shape of the object can be determined from these two images. For this, a control unit 9 is provided, which can evaluate the two images from the two channels. Based on the thus-constructed three-dimensional shape of the object 2, the desired three-dimensional measurement can then be carried out.

In order to be able to determine the three-dimensional shape from the images such that a three-dimensional measurement is possible, it is not only necessary to take account of the precise knowledge of the imaging position and of the optical channels, but furthermore there must be, per channel, a common projection centre P for all object points of the recorded object 2. However, such a common projection centre does not generally exist in stereomicroscopy.

Figure 2:
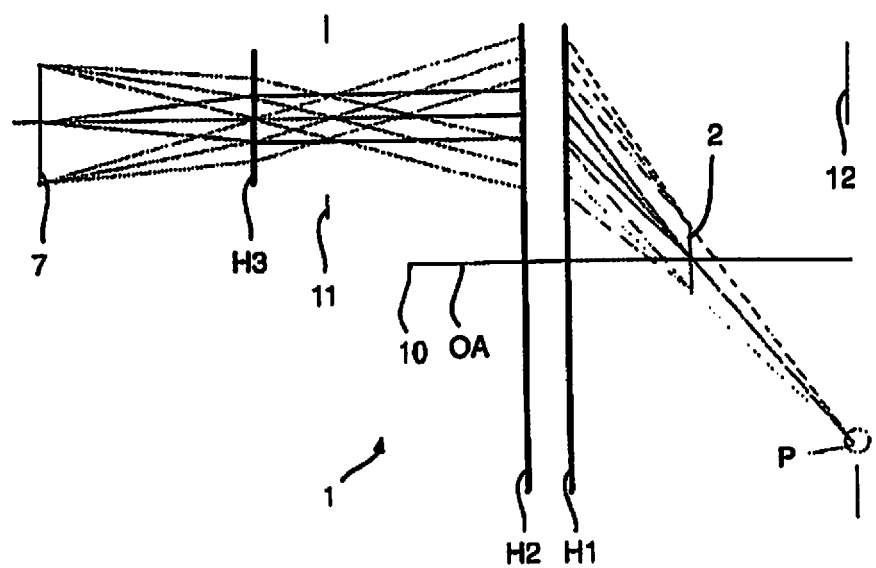
FIG. 2 is a schematic view of the ray path of the left stereo channel for explaining the common projection centre.
Figure 3:
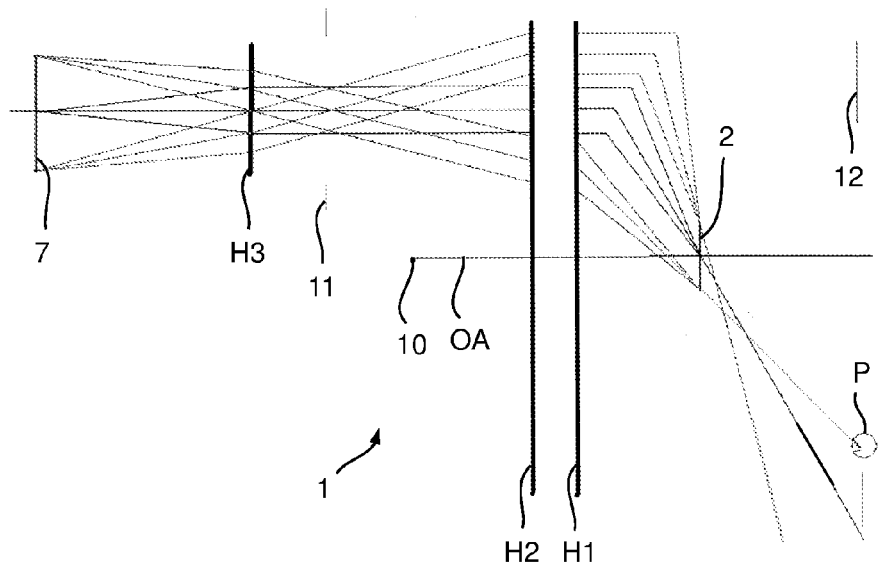
FIG. 3 is a view corresponding to FIG. 2, wherein the Abbe sine condition has been taken into account.

As can be seen from the schematic representation in FIGS. 2 and 3, in which only the left stereochannel is shown and the objective 4 is represented by the two principal planes H1 and H2 and the first tube lens is represented by the principal plane H3, a common projection centre P only exists in the idealized case (FIG. 2). When the Abbe sine condition is taken into account, generally no common projection centre is present (FIG. 3). FIGS. 2 and 3 also show the entrance pupil 12 of the objective 4.

There is, however, a set-up of the stereomicroscope 3 in which the desired common projection centre P is present during recording. This is the case when object-side telecentric conditions exist. As can be seen from the corresponding diagram in FIG. 4, in this case the projection centre is at infinity (and therefore is not shown in FIG. 4).

Figure 4:
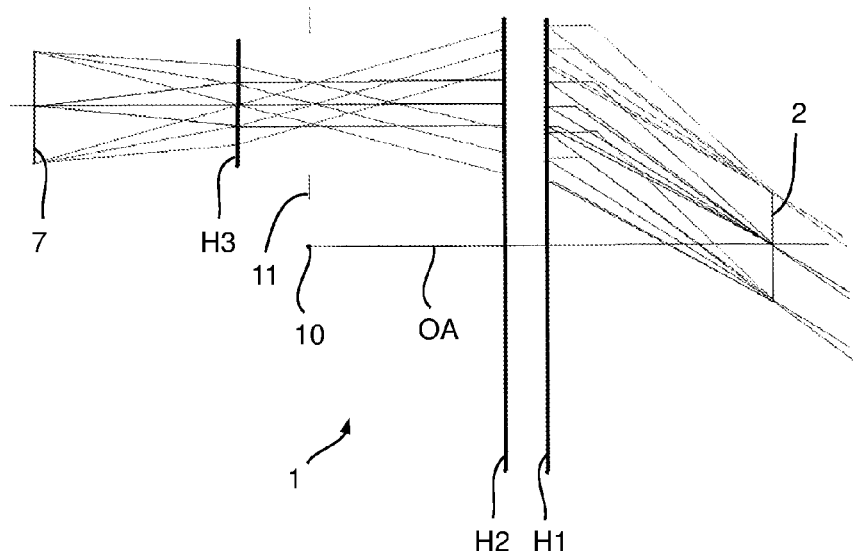
FIG. 4 is a view according to FIG. 2, wherein object-side telecentric conditions prevail.

Object-side telecentric conditions can be achieved when the rear focus 10 of objective 4, relative to the optical axis (OA) of objective 4, coincides with the entrance pupil 11 of the tube lens 5, as can be seen by comparing the representation in FIG. 4 with the representation in FIGS. 2 and 3.

In the device according to the depicted embodiments of the invention, the stereomicroscope 3 is therefore operated such that when recording the object 2, object-side telecentric conditions are obtained.

An inequality can also be given, with which it is possible to determine whether, with the given settings of the stereomicroscope, the desired object-side telecentric conditions are adequately obtained. When the inequality is valid for all magnifications of the stereomicroscope, measurements can be made stereoscopically without restriction.

$$|s_p| > \left| f' + \frac{10y \cdot \beta'_{max}}{\beta' \cdot NA_{max}^2 \sqrt{1 - NA_{max}^2}} \right|$$

In this inequality, $s_p$ denotes the distance from the entrance pupil 11 of the objective 4 to the front principal plane H1 of the objective along the optical axis OA, f' denotes the focal length of the objective, y denotes the height of the imaged object 2, $\beta'$ denotes the imaging scale of the stereomicroscope relative to the intermediate image plane, $\beta'_{max}$ denotes the maximum imaging scale of the stereomicroscope relative to the intermediate image plane and $NA^2_{max}$ denotes the numerical aperture at the highest magnification in single-channel conditions. The entrance pupil 11 of the objective 4 results from the imaging of the pupil of the tube lens 5, 6 in the object space by the objective 4.

If the above inequality is fulfilled, meaningful measurement is possible within ten times the wave-optical depth of field. Outside of this region, the imaging quality is so poor that interesting details can no longer be resolved anyway. Moreover, measurement errors are permitted that are below the Abbe resolution limit.

The invention claimed is:

1. A device for three-dimensional measurement of an object comprising:
   a stereomicroscope of a telescope type, the stereomicroscope having a common objective, a first tube lens, and a second tube lens;
   a first image sensor associated with the first tube lens that is configured to obtain a first image;
   a second image sensor associated with the second tube lens and that is configured to obtain a second image; and
   a control unit that is configured to determine the three-dimensional shape of the object from the first image and the second image and is configured to carry out a predetermined three-dimensional measurement,
   wherein the first image and the second image are based on object-side telecentric conditions of the microscope.

2. The device of claim 1, in which, for establishing the object-side telecentric conditions of the microscope, the first tube lens, the second tube lens, and the objective are positioned such that the entrance pupils of the first tube lens and the second tube lens, relative to the optical axis of the objective, coincide with the rear focus of the objective.

3. The device of claim 1, in which, for establishing the object-side telecentric conditions of the microscope, the first tube lens, the second tube lens, and the objective are configured such that the following inequality:

$$|s_p| > \left| f' + \frac{10y \cdot \beta'_{max}}{\beta' \cdot NA_{max}^2 \sqrt{1 - NA_{max}^2}} \right|$$

is fulfilled, wherein $s_p$ denotes the distance from entrance pupils of the objective along an optical axis of the objective to a front principal plane of the objective, wherein the entrance pupils result from the imaging of pupils of each of the first tube lens and the second tube lens in the object space by the objective, y denotes the height of the imaged object, $\beta'$ denotes an imaging scale of the stereomicroscope relative to the intermediate image plane, $\beta'_{max}$ denotes a maximum imaging scale of the stereomicroscope relative to an intermediate image plane and $NA^2_{max}$ denotes a numerical aperture of a highest magnification of the respective channel.

4. The device of claim 2, further comprising, for establishing the object-side telecentric conditions of the microscope, the first tube lens, the second tube lens, and the objective are configured such that the following inequality:

$$|s_p| > \left| f' + \frac{10y \cdot \beta'_{max}}{\beta' \cdot NA^2_{max}\sqrt{1 - NA^2_{max}}} \right|$$

is fulfilled, wherein $s_p$ denotes the distance from entrance pupils of the objective along an optical axis of the objective to a front principal plane of the objective, wherein the entrance pupils result from the imaging of pupils of each of the first tube lens and the second tube lens in the object space by the objective, y denotes the height of the imaged object, $\beta'$ denotes an imaging scale of the stereomicroscope relative to the intermediate image plane, $\beta'_{max}$ denotes a maximum imaging scale of the stereomicroscope relative to an intermediate image plane and $NA^2_{max}$ denotes a numerical aperture of a highest magnification of the respective channel.

5. A method for three-dimensional measurement of an object with a stereomicroscope of a telescope type, the stereomicroscope having a common objective and a pair of tube lenses, the method comprising:
   recording two images of the object, one image via each of the pair of tube lenses;
   determining a three dimensional shape of the object based on the two images obtained;
   carrying out a predetermined three-dimensional measurement; and
   recording the images with object-side telecentric conditions of the stereomicroscope.

6. The method according to claim 5, further comprising, for establishing the object-side telecentric conditions of the microscope, configuring the pair of tube lenses and the objective such that entrance pupils of each of the pair of tube lenses coincide with a rear focus of the objective, relative to an optical axis of the objective.

7. The method according to claim 5 further comprising, for establishing the object-side telecentric conditions of the microscope, configuring the pair of tube lenses and the objective such that the following inequality:

$$|s_p| > \left| f' + \frac{10y \cdot \beta'_{max}}{\beta' \cdot NA^2_{max}\sqrt{1 - NA^2_{max}}} \right|$$

is fulfilled, wherein $s_p$ denotes the distance from entrance pupils of the objective along the optical axis of the objective to the front principal plane of the objective, wherein the entrance pupils result from imaging of the pupils of the pair of tube lenses in an object space by the objective, y denotes a height of the imaged object, $\beta'$ denotes an imaging scale of the stereomicroscope relative to an intermediate image plane, $\beta'_{max}$ denotes a maximum imaging scale of the stereomicroscope relative to the intermediate image plane and $NA^2_{max}$ denotes a numerical aperture of a highest magnification of the respective channel.

8. The method according to claim 6 further comprising, for establishing the object-side telecentric conditions of the microscope, configuring the pair of tube lenses and the objective such that the following inequality:

$$|s_p| > \left| f' + \frac{10y \cdot \beta'_{max}}{\beta' \cdot NA^2_{max}\sqrt{1 - NA^2_{max}}} \right|$$

is fulfilled, wherein $s_p$ denotes the distance from the entrance pupils of the objective along the optical axis of the objective to the front principal plane of the objective, wherein the entrance pupils result from imaging of the pupils of the pair of tube lenses in an object space by the objective, y denotes a height of the imaged object, $\beta'$ denotes an imaging scale of the stereomicroscope relative to an intermediate image plane, $\beta'_{max}$ denotes a maximum imaging scale of the stereomicroscope relative to the intermediate image plane and $NA^2_{max}$ denotes a numerical aperture of a highest magnification of the respective channel.

* * * * *

UNITED STATES PATENT AND TRADEMARK OFFICE
CERTIFICATE OF CORRECTION

| | |
|---|---|
| PATENT NO. | : 9,279,668 B2 |
| APPLICATION NO. | : 13/825790 |
| DATED | : March 8, 2016 |
| INVENTOR(S) | : Rolf Wartmann |

It is certified that error appears in the above-identified patent and that said Letters Patent is hereby corrected as shown below:

<u>On the Title Page Item (57), in the Abstract:</u>

In line 5, delete "(8)".

<u>In the Specification:</u>

In column 2, line 53, delete "There" and insert --These--.

Signed and Sealed this
Fifth Day of July, 2016

Michelle K. Lee
*Director of the United States Patent and Trademark Office*